(12) United States Patent
Chung

(10) Patent No.: US 11,897,397 B2
(45) Date of Patent: Feb. 13, 2024

(54) MOUNTING BASE FOR MOUNTING SENSORS

(71) Applicant: WeRide Corp., Sunnyvale, CA (US)

(72) Inventor: Ji Yoon Chung, Sunnyvale, CA (US)

(73) Assignee: WERIDE CORP., Sunnyvale, CA (US)

( * ) Notice: Subject to any disclaimer, the term of this patent is extended or adjusted under 35 U.S.C. 154(b) by 825 days.

(21) Appl. No.: 16/891,073

(22) Filed: Jun. 3, 2020

(65) Prior Publication Data

US 2020/0386860 A1 Dec. 10, 2020

Related U.S. Application Data

(60) Provisional application No. 62/857,784, filed on Jun. 5, 2019.

(51) Int. Cl.
*B60R 11/04* (2006.01)
*G01S 17/931* (2020.01)
*G01S 7/481* (2006.01)
*B60R 11/00* (2006.01)

(52) U.S. Cl.
CPC ......... *B60R 11/04* (2013.01); *B60R 2011/004* (2013.01); *B60R 2011/0064* (2013.01); *G01S 7/481* (2013.01); *G01S 17/931* (2020.01)

(58) Field of Classification Search
CPC ....................................................... B60R 11/04
USPC ........................................................... 73/756
See application file for complete search history.

(56) References Cited

U.S. PATENT DOCUMENTS

| 11,156,485 B1* | 10/2021 | Krishnan | ............. B60R 11/00 |
| 2010/0014556 A1* | 1/2010 | Huynh | ................ G01K 1/20 |
| | | | 374/E1.018 |
| 2020/0191614 A1* | 6/2020 | Ellgas | .................. G01D 11/24 |

* cited by examiner

*Primary Examiner* — Walter L Lindsay, Jr.
*Assistant Examiner* — Philip T Fadul
(74) *Attorney, Agent, or Firm* — Jun He Law Offices P.C; James J. Zhu

(57) ABSTRACT

A mounting base for sensor is provided. The mounting base comprises: a body having a top surface; a mounting portion located on the top surface of the body, the mounting portion is configured for mounting a sensor; and at least one airflow generating component, the airflow generating component is configured for forming at least one airflow on a side of the sensor mounted on the mounting portion.

15 Claims, 6 Drawing Sheets

МOUNTING BASE FOR MOUNTING SENSORS

TECHNICAL FIELD

The present disclosure generally relates to a mounting base, more particularly, to a mounting base for mounting sensors.

BACKGROUND

The acquisition of information of objects in a real-world environment is of interest in many industries. A plurality types of sensors can be used for obtaining the information of objects in a real-world environment, such as cameras, LiDAR ("Light Detection and Ranging") sensors and the like. Recent advances in scanning technology, such as technologies utilizing LiDAR scanning, have resulted in the ability to collect billions of point samples on physical surfaces. A typical LiDAR sensor includes a source of optical radiation and an optical detection device. The source of optical radiation, for example, a laser, emits light into a region, and the optical detection device, which may include one or more optical detectors or an array of optical detectors, receives reflected light from the region and converts the reflected light into readable format(s) that allows identifying and generating information associated with one or more target objects in the region.

The developing autonomous vehicle industry also often utilizes cameras and LiDAR sensors for object detection and navigation. Generally, these sensors are often mounted on the exterior of a vehicle, for example, on the roof and/or side view mirrors. The positioning of these sensors may present some serious challenges. For example, the sensors may be subjected to rain or snow drops, dust and other items. Many of these conditions can lead to that the sensors get partially or completely blocked or obscured, thus hindering the performance of the sensor.

SUMMARY

According to a first aspect of embodiments of the present disclosure, a mounting base for sensor is provided. The mounting base comprises: a body having a top surface; a mounting portion located on the top surface of the body, the mounting portion is configured for mounting a sensor; and at least one airflow generating component, the airflow generating component is configured for forming at least one airflow on a side of the sensor mounted on the mounting portion.

According to a second aspect of embodiments of the present disclosure, a sensor assembly is provided. The sensor assembly comprises a sensor; and a mounting base. The mounting base comprises: a body having a top surface; a mounting portion located on the top surface of the body, the mounting portion is configured for mounting a sensor; and at least one airflow generating component, the airflow generating component is configured for forming at least one airflow on a side of the sensor mounted on the mounting portion.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

The same reference numbers will be used throughout the drawings to refer to the same or like parts.

DETAILED DESCRIPTION OF THE PREFERRED EMBODIMENTS

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

In this application, the use of the singular includes the plural unless specifically stated otherwise. In this application, the use of "or" means "and/or" unless stated otherwise. Furthermore, the use of the term "including" as well as other forms such as "includes" and "included" is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
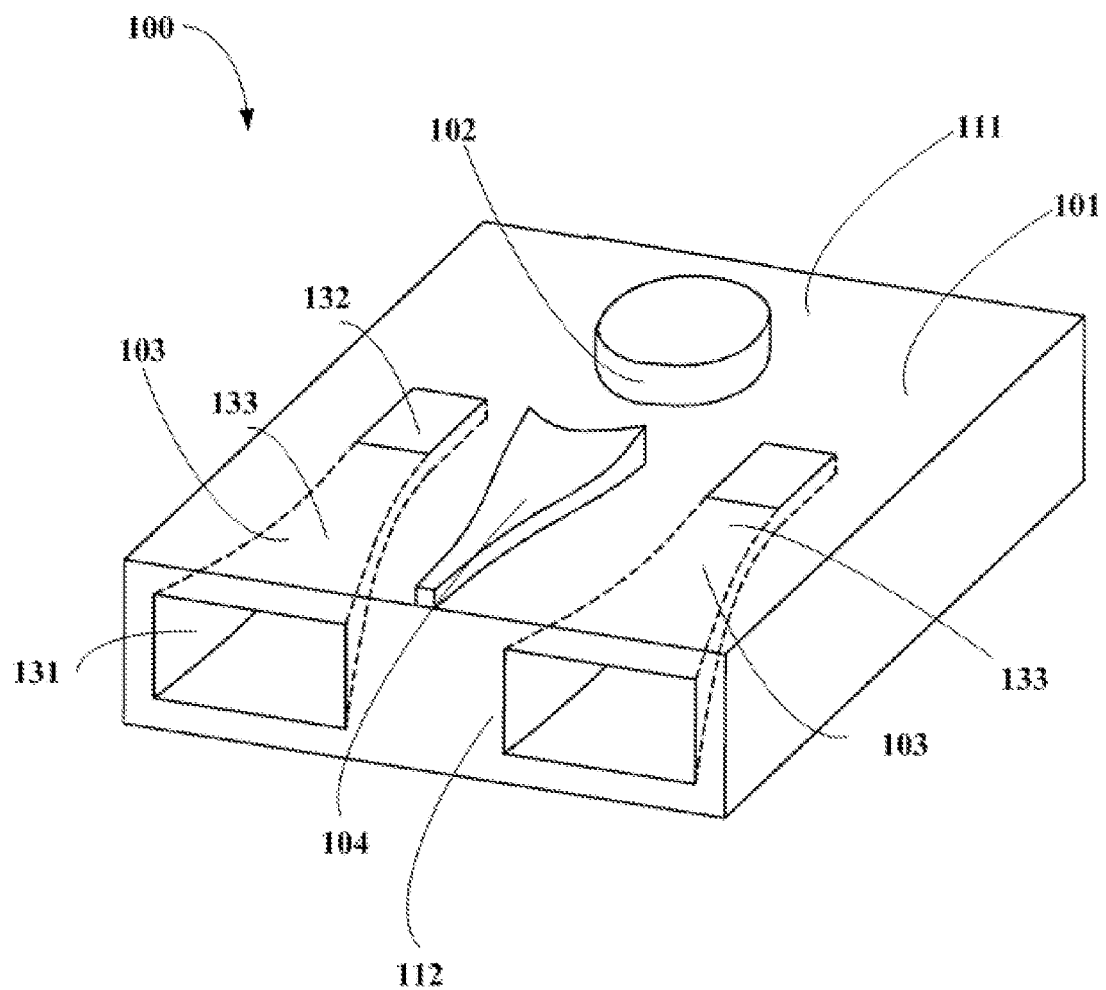
FIG. 1 depicts a perspective view of a mounting base for mounting sensors according to one embodiment of the present disclosure.

FIG. 1 depicts a perspective view of a mounting base 100 according to one embodiment of the present disclosure. As shown in FIG. 1, the mounting base 100 includes a body 101, which has a top surface 111 and a front surface 112, and a mounting portion 102 located on the top surface 111 of the body 101. The body 101 may be made of any suitable materials, such as metallic or polymer materials. The mounting portion 102 is used to secure a sensor to the body 101 of the mounting base 100. The sensor can be mounted to the mounting portion 102 in any suitable means, such as via a snap connection, a thread connection, a welding connection and the like. In some instances, the sensor is detachably secured to the mounting portion 102 of the body 101. In this way, the mounting base 100 can be used to mount different types of sensors, which can expand the application range of the mounting base 100. In some instances, the mounting portion 102 itself is detachably secured to the body 101, such that if the mounting portion 102 does not match with a sensor with specific dimensions, it can be replaced with different types of mounting portions for mounting respective sensors with other specific dimensions. In other instances, the mounting portion 102 is integrally formed with the body 101. For example, the mounting portion 102 and the body 101 are integrally molded by injection molding.

With continued reference to FIG. 1, the mounting base 100 includes two airflow generating components 103. The airflow generating components 103 are configured for respectively forming two airflows at two sides of the sensor mounted on the mounting portion 102. As shown in FIG. 1, the airflow generating component 103 includes an air duct 133, which has an inlet 131 positioned on the front face 112 of the body 101 and an outlet 132 positioned on the top surface 111 of the body 101. Specifically, the outlet 132 has an area smaller than the inlet 131, and the air duct 133 tapers from the inlet 131 to the outlet 132, such that an airflow flowing into the inlet 131 can be accelerated when flowing out of the outlet 131. Although the inlet 131 and outlet 132 are both shown as square openings, they can alternatively be of different shapes, such as being circular, triangular, oval or of any other suitable shape. At or closed to each of the inlet 131 and/or outlet 132 of the air duct 133 there may be a blocking sheet which is movable relative to the inlet 131 and/or the outlet 132 substantially in a cross sectional plane, so as to adjust the opening size of the inlet 131 and/or the outlet 132 and thus adjust the speed of the airflow flowing out of the outlet 132. In some examples, the blocking sheet can be coupled to a controller or central processor of the vehicle to receive information relating to the speed of the vehicle or movement of the vehicle, so as to further automatically adjust the opening size of the inlet 131 and/or the outlet 132 according the speed of the vehicle or the external environment of the vehicle. For example, the blocking sheet may be configured to decrease the opening size of the outlet 132 as the vehicle is moving at a relative low speed, so as to improve the speed of the airflow.

Although not shown in FIG. 1, the mounting base 100 may also include a third airflow generating component that is configured to generate an airflow substantially on a rear side of the mounted sensor. In some embodiments, the airflow generated by the third airflow generating component is generally perpendicular to the airflow formed by the other two airflow generating components 103, but may not in the same plane. For example, the airflow generated by the third airflow generating component may flow substantially upward along the rear side the mounted sensor. In an instance, the third airflow generating component can also be a third air duct having an inlet on the front face 112, an outlet on the top surface 111, and a duct portion between them which can be of a curved shape to avoid the mounted sensor. The duct portion is configured to generating an airflow on the rear side of the mounted sensor. For example, the duct portion may have a first duct portion and a second duct portion which are connected and generally perpendicular to each other, or the duct portion may have an arc shape. The inlet or outlet of the third air duct may also has a similar blocking sheet for adjusting their respective opening sizes, such that the third air duct can be entirely blocked or generate a low-speed airflow when needed. It should be noted that the blocking sheet of each duct can also be adjusted together, so as to form different arrangements of airflows near the mounted sensor to fulfill the requirements of different driving modes or external environments. In some examples, the third air duct may have two sub paths that assume a symmetric arrangement relative to and surrounding the mounted sensor to avoid the mounted sensor.

Furthermore, although the airflow generating components of the mounting base 100 are two air ducts 133, it should be noted that, the airflow generating component may be any other airflow generator that can generate at least one airflow on a side of the sensor mounted on the mounting portion 102. For example, airflow generating component can be an airflow generator that forms an airflow on a side of the sensor mounted on the mounting portion 102. The airflow generator can be any types of devices that can generate an airflow, such as a rotary fan, a rotary blower or a piezoelectric blower. The air generator can be positioned on the top surface 111 of the body 101 or within the body 101.

As shown in a FIG. 1, the mounting base 100 also includes a fin 104. The fin 104 is positioned in front of the mounting portion 102, and is shaped to split the airflow impinging thereon into two airflows flowing on both sides of the sensor mounted on the mounting portion 102. In some instances, a portion of the pin 104 closer to the sensor mounted on the mounting portion 102 may have a larger cross sectional area perpendicular to the flowing direction of the airflow towards the sensor. For example, the fin 104 may be generally a triangular pole. In other instances, the fin 104 may be of any other suitable shape which can guide the airflow impinging thereon into at least one airflow flowing on a side of the sensor mounted on the mounting portion 102. In some instances, the fin is detachably fixed on the top surface 111 of the body 101, such that the fin 104 can be replaced with fins with different shapes suitable for sensors with different shapes or dimensions. Specifically, when the sensor mounted on the mounting portion 102 is replaced with a sensor with a larger dimension, the fin 104 can be correspondingly replaced to have a larger dimension, so as to split the airflow impinging thereon into two airflow flowing on both sides of the larger sensor mounted thereon. In some instance, the fin 104 is designed to reduce air pressure on the front surface of the sensor mounted on the mounting portion 102, so as to reduce the possibility of collision with unwanted objects like raindrops, snowflakes, and the like. Some phototactic insects tend to fly to the sensor emitting light, and the fin 104 can also help to block the insects.

Figure 2:
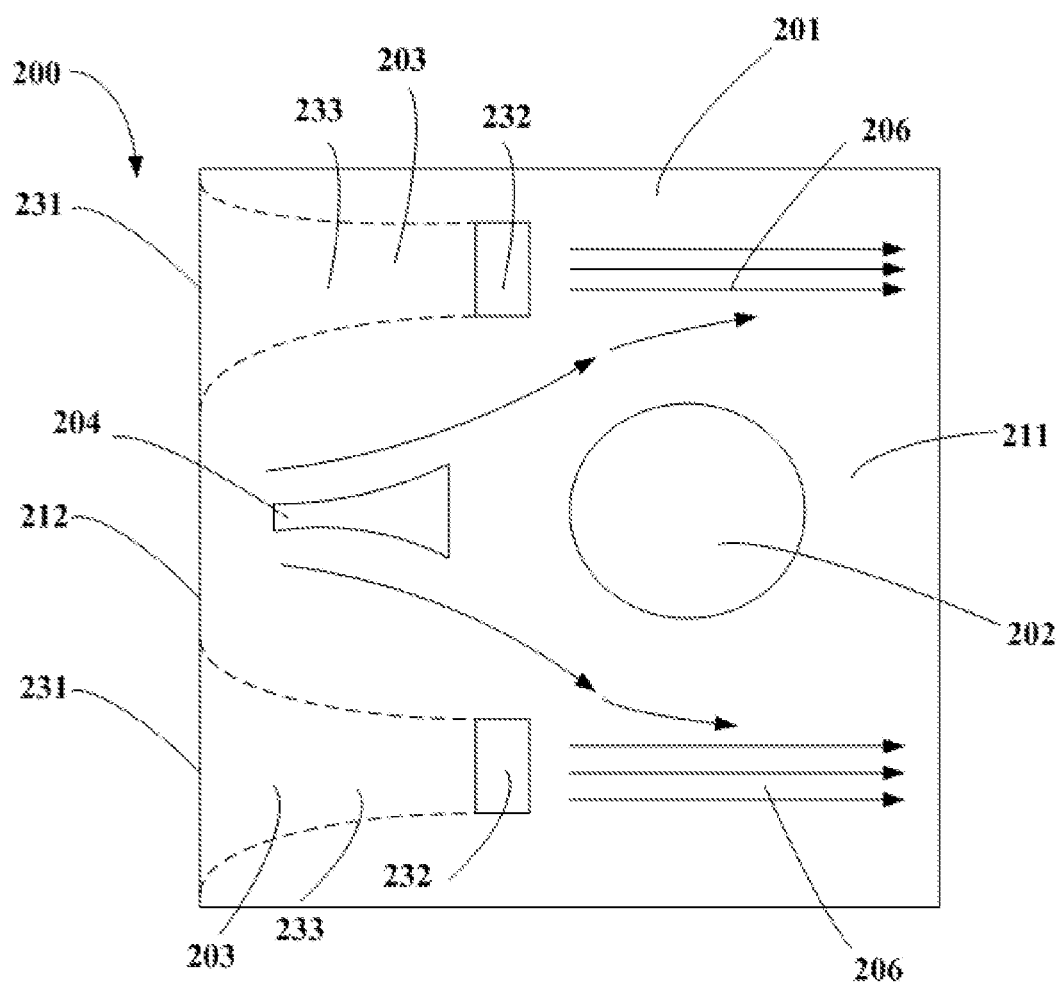
FIG. 2 depicts a top view of a mounting base for mounting sensors according to one embodiment of the present disclosure.
Figure 3:
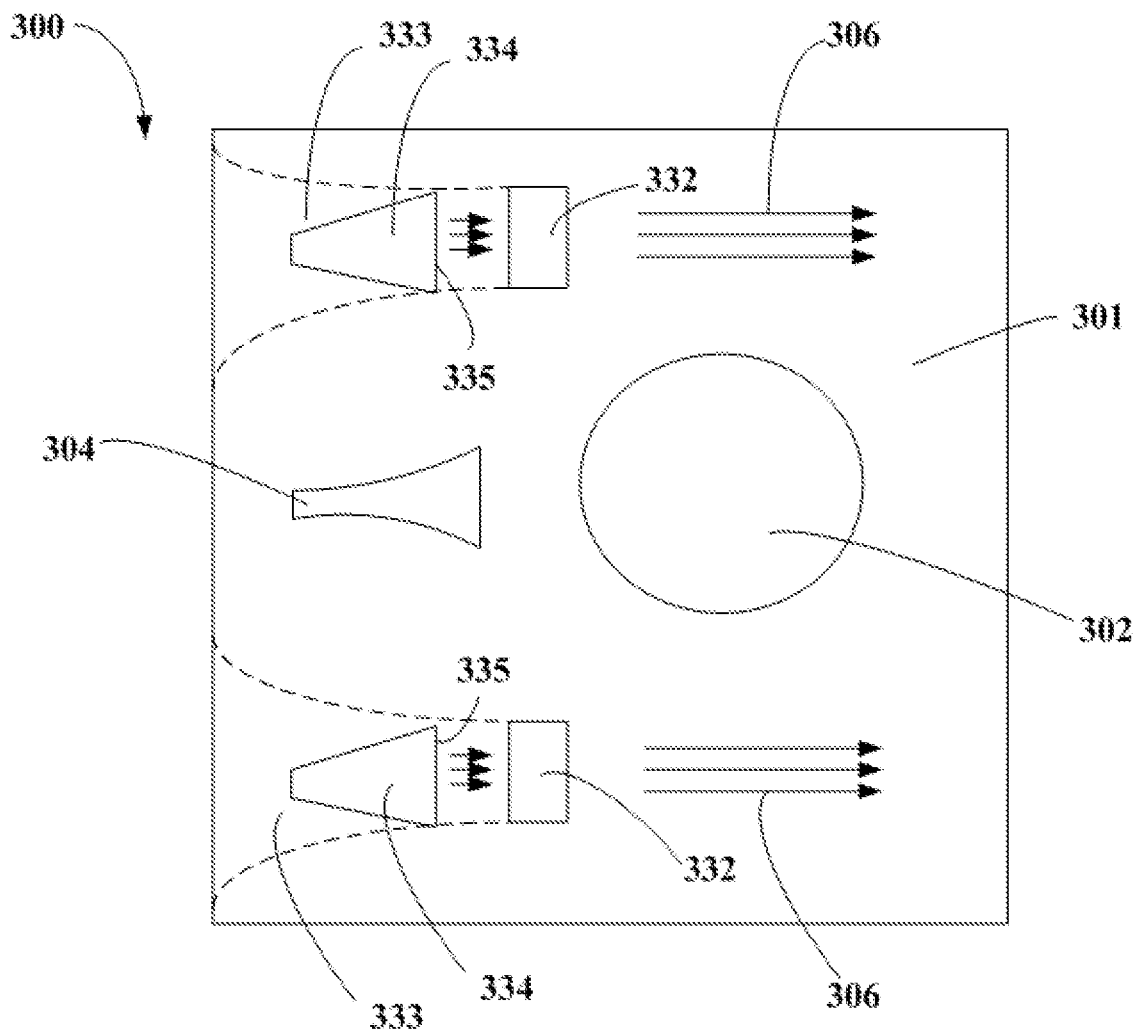
FIG. 3 depicts a top view of a mounting base for mounting sensors according to another embodiment of the present disclosure.

FIG. 2 depicts a top view of a mounting base 200 for mounting sensors according to one embodiment of the present disclosure. FIG. 3 depicts a top view of a mounting base 300 for mounting sensors according to another embodiment of the present disclosure.

The structure of the mounting base 200 is substantially identical to that shown in FIG. 1. As shown in FIG. 2, the airflow generating component 203 is an air duct 233 having an inlet 231 positioned on the front face 212 of the body 201 and an outlet 232 positioned on the top surface 211, and the air duct 233 is tapering from the inlet 231 to the outlet 232, so as to speed up the air flowing into the air duct. In addition, the mounting base 200 also has a fin 204 positioned on the top surface 211 of the body 201 and in front of the mounting portion 202. The fin 204 splits the airflow impinging thereon into two airflows respectively flowing on both sides of the sensor mounted on the mounting portion 202. As can be seen, the airflow generating components 203 and the fin 204 are configured to generate two high speed air flows 206 flowing on the left and right sides of the sensor mounted on the mounting portion 202. Those airflows 206 can reduce air pressures at both left and right sides of the sensor and form two respective negative pressure regions on both sides of the sensor, so that particles, such as snow drops, rain drops or dusts, are more likely to be sucked into the negative pressure regions and keep away from the mounted sensors. In addition, the high speed airflow 206 can also blow the particles in its flowing direction, so as to drive away the particles. Therefore, the mounting base 200 can reduce the possibility of collision of particles, such as dusts, snow drops and rain drops, to the sensors mounted on the mounting portion 202.

In some instances, a distance along a first direction between the outlet 232 of the airflow generating component 203 and the sensor mounted on the mounting portion 202 is from 0.05 meter to 0.18 meter, and a distance along a second direction between the outlet 232 of the airflow generating component 203 and the sensor mounted on the mounting portion 202 is from 0.05 meter to 0.25 meter. The term "first direction" is a direction in a plane parallel to the top surface 211, which is generally along the flowing direction of the airflow generated by the airflow generating component 203, and "second direction" is a direction in the plane, which is perpendicular to the "first direction".

As shown in FIG. 3, the mounting base 300 is similar to that shown in FIG. 1. However, the mounting base 300 has a pair of airflow generators 334 located on the top surface of the body 301. Each airflow generator 334 is configured to make its blowing opening 335 generally towards the flowing direction of the airflow 306, so as to improve the speed of the airflow 306, especially in the condition that the air duct 303 is unable to generate an airflow 306 with sufficient flowing speed.

The airflow generator 334 may be any type of airflow generator that can generate an airflow flowing out of its blowing opening 335. For example, the airflow generator 304 may be an electrically powered fan or impeller, such as a rotary fan, a rotary blower or a piezoelectric blower. In some instances, the airflow generator 334 is detachably fixed on the top surface 311 of the body 301. In other instances, the airflow generator 334 is fixed on the top surface 311 of the body 301. In some instance, the air generator 334 is rotatably attached on the top surface 311, such that it can be rotated to make its blowing opening 335 directly face the sensor mounted on the mounting portion 302. In this way, the air generator 334 can also be used to blow the sensor to clean some dusts or particles already adhered on the surface of the sensor.

It should be noted that, the airflow generator 334 can also be positioned within the air duct 333, so as to improve the speed of airflow flowing within the air duct 333. Although the mounting base 300 has both the air duct 333 and the airflow generator 334, in some instances, the mounting base 300 may have only the airflow generator 334, which is used to individually generate the high speed airflows 306 flowing on at least one side of the sensor mounted on the mounting portion 302. Furthermore, although the mounting bases as shown in FIGS. 1, 2 and 3 can form two airflows on both sides of the mounted sensor, it should be noted that in some instances, the airflow generating component, the fin and/or the airflow generator are configured to generate only one airflow flowing on a side of the mounted sensor. For example, the mounting base may have only one airflow generator 334 and no air duct 333 or fin 304, and the airflow generator 334 is positioned to individually generate an airflow 306 flowing on one side of the sensor mounted on the mounting portion 302.

Figure 4:
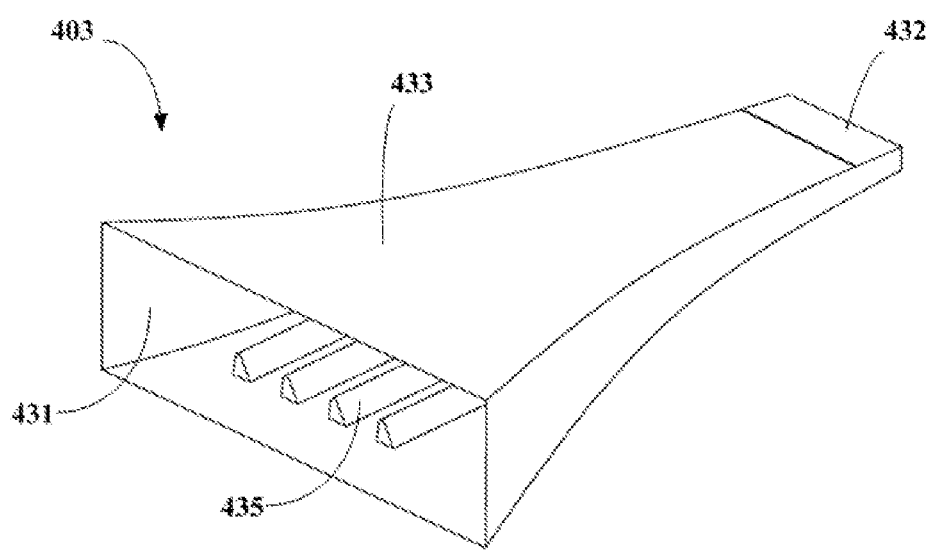
FIG. 4 depicts a schematic view of an air duct of a mounting base for mounting sensors according to one embodiment of the present disclosure.

FIG. 4 depicts a schematic view of an airflow generating component 403 of a mounting base for mounting sensors according to one embodiment of the present disclosure. As shown in FIG. 4, the airflow generating component 403 has an air duct 433 having an inlet 431 and an outlet 432, and the air duct 433 has a cross sectional area decreasing from the inlet 431 to the outlet 432. As shown in FIG. 4, the air duct 433 further includes a temperature adjusting device 435 positioned within the air duct 403. The temperature adjusting device 435 is used to heat or cool the airflow flowing within the air duct 433. With the temperature adjusting device 435, the airflow heated or cooled by the temperature adjusting device 435 can help maintain the temperature of the sensor when the sensor is operating in some extreme temperature conditions, such as in too cold or too hot conditions. In addition, the temperature adjusting device 435 also can bring other benefits. For example, the heated airflow can help raise the surface temperature of the sensor, so as to melt snow drops or ices adhered to the sensor.

Further referring to FIG. 4, the temperature adjusting device 435 has a plurality of elongated heating/cooling members extending along the air duct 403. Each of the elongated heating/cooling members has a triangular cross-sectional shape and either a constant cross-sectional area or a tapering cross-sectional area, so as to provide a sufficient surface area that contacts an airflow along the air duct 403 without dramatically affecting its speed. In some instances, an area of the cross section of the elongated heating/cooling member may increase gradually from the inlet 431 to the outlet 432, which may help to gradually accelerate the airflow along with the tapered channel within the air duct 433. As shown in FIG. 4, the plurality of elongated heating/cooling members of the temperature adjusting device 435 are displaced at the bottom of the inner surface of the air duct 403. However, the temperature adjusting device 435 may also have a plurality of similar or identical elongated heating/cooling members positioned at the top of the inner surface of the air duct 403. The elongated heating/cooling members on the top inner surface may be disposed substantially parallel to but stagger the elongated heating/cooling members on the bottom surface. That it, the upper elongated heating/cooling members may face towards and align with the respective gaps between the lower elongated heating/cooling members, such that the temperature of airflow along the air duct 403 can be sufficiently adjusted without dramatically affecting the speed of the airflow. In some examples, the temperature adjusting device 435 may also have a plurality of similar or identical elongated heating/cooling members on the lateral inner surfaces of the air duct 403. In other examples, the temperature adjusting device 435 may be formed as an integral part having a comb shape, so as to provide an even larger contacting surface for heating or cooling the airflow.

It will be readily apparent to those skilled in the art that the temperature adjusting device 435 may include any of the conventional heating or cooling devices. For example, the temperature adjusting device 435 may include a heating element, which converts electrical energy into heat through the process of Joule heating. In some instance, the temperature adjusting device 435 may include any conventional types of cooling devices, such as a mechanical chiller, an absorption chiller or a thermoelectric cooling device like Peltier devices. In some instance, the temperature adjusting device 435 includes a heat exchanger.

Figure 5:
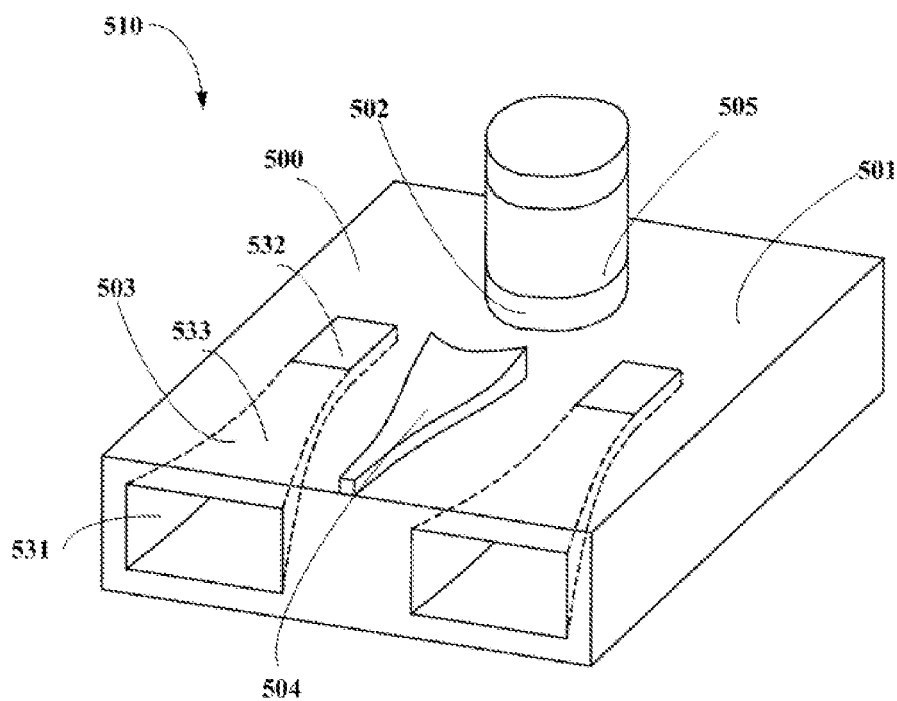
FIG. 5 depicts a perspective view of a sensor assembly according to one embodiment of the present disclosure.

FIG. 5 depicts a perspective view of a sensor assembly 510 according to one embodiment of the present disclosure. As shown in FIG. 5, the sensor assembly 510 includes a sensor 505 and a mounting base 500. Components and structures of the mounting base 500 are identical as the mounting base 100 shown in FIG. 1, which will not be elaborated herein. The sensor 505 may be any types of sensors that can be used for obtaining the information of objects in a real-world environment, such as cameras, LiDAR ("Light Detection and Ranging") sensors and the like. As we mentioned before, the sensor 505 may be detachably mounted to the mounting portion 502 in any suitable means, such as via a snap connection, a thread connection and the like. In this way, the mounting base 500 can be used to mount different types of sensors 505, which can expand the application range of the mounting base 500. In other instances, the sensor 505 is fixed to the mounting base 500. In some instances, the sensor assembly 510 and the mounting base 500 are integrally formed.

Figure 6:
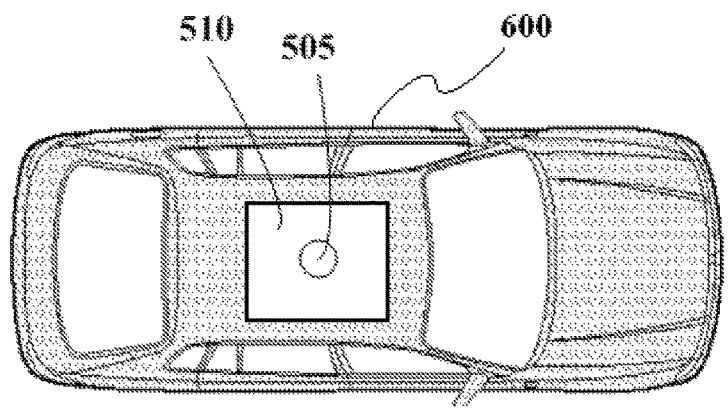
FIG. 6 depicts a schematic view of a vehicle mounted with the sensor assembly of FIG. 5.

FIG. 6 depicts a schematic view of a vehicle 600 mounted with the sensor assembly 510 of FIG. 5. As shown in FIG. 6, the sensor assembly 510 is mounted on a roof of a vehicle 600. In some instances, the sensor assembly 510 can be mounted to any other portion of the vehicle 600, such as a side view mirror and/or a trunk of the vehicle 600. In some instances, the sensor assembly 510 may be detachably mounted on the vehicle 600 in any suitable means, such as via a snap connection, a thread connection, which facilitates the maintenance of the sensor assembly 510. In some instance, the sensor assembly 510 is fixed on the top of the vehicle 600.

In some instances, the device 500 is mounted on the vehicle 600 with its front face 512 facing the driving direction of the vehicle 600. In this way, when the vehicle is driving at a relatively high speed, such as beyond 40 km/h or higher, air may flow into an inlet 531 positioned on the front face 512 and then generate a high speed airflow on the sides of the sensors 505. In some instances, the mounting base 500 may further include an airflow generator as the one shown in FIG. 3. When the vehicle 600 is driving at a slow speed, such as less than 20 km/h, the air duct 503 cannot generate an airflow possessing sufficient flowing speed. In such circumstance, the airflow generator on the top surface 511 or within the air duct 533 may be used to improve the flowing speed of the foresaid airflow.

In some instance, the vehicle 600 may be a self-driving vehicle, and it may further include certain common components which are included in ordinary vehicles, such as, an engine, wheels, steering wheel, transmission, etc., which may be controlled using a variety of communication signals and/or commands, such as, for example, acceleration signals or commands, deceleration signals or commands, steering signals or commands, braking signals or commands, etc. The vehicle 600 is controlled according to the information acquired by the sensor assembly 510.

It should be noted that, the device disclosed in the embodiments of the present disclosure can be implemented by other ways. The aforementioned device embodiments are merely illustrative. Various embodiments have been described herein with reference to the accompanying drawings. It will, however, be evident that various modifications and changes may be made thereto, and additional embodiments may be implemented, without departing from the broader scope of the invention as set forth in the claims that follow. Although different portions of the mounting base or sensor assembly and sub-portions of these different portions are mentioned in the above detailed description, such division is merely exemplary and not mandatory.

Furthermore, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A mounting base for sensor, comprising:
a body having a top surface;
a mounting portion located on the top surface of the body, wherein the mounting portion is configured for mounting a sensor; and
at least one airflow generating component, the airflow generating component being configured for forming at least one airflow on a side of the sensor mounted on the mounting portion;
wherein the airflow generating component is an air duct, the air duct has an inlet positioned on a front face of the body and an outlet positioned on a top face of the body.

2. The mounting base of claim 1, wherein a distance along a first direction between an outlet of the airflow generating component and the sensor mounted on the mounting portion is from 0.05 meter to 0.18 meter, and a distance along a second direction between the outlet of the airflow generating component and the sensor mounted on the mounting portion is from 0.05 meter to 0.25 meter.

3. The mounting base of claim 1, wherein the outlet of the air duct is smaller than the inlet of the air duct.

4. The mounting base of claim 1, wherein the mounting base has a temperature adjusting device configured for adjusting the temperature of an airflow passing through the air duct.

5. The mounting base of claim 1, wherein the mounting base comprises a fin, and the fin is positioned in front of the mounting portion, so as to guide an airflow towards the fin flowing on at least one side of the sensor mounted on the mounting portion.

6. The mounting base of claim 1, wherein the mounting base comprises an airflow generator, the airflow generator is configured for forming at least one airflow on a side of the sensor mounted on the mounting portion.

7. The mounting base of claim 6, wherein the airflow generator is positioned within the air duct and is configured for improving a flow speed of an airflow passing through the air duct.

8. A sensor assembly, comprising:
a sensor; and
a mounting base, wherein the mounting base comprises:
a body having a top surface;
a mounting portion located on the top surface of the body, the mounting portion is configured for mounting a sensor; and
at least one airflow generating component, the airflow generating component is configured for forming at least one airflow on a side of the sensor mounted on the mounting portion;
wherein the airflow generating component is an air duct, the air duct has an inlet positioned on a front face of the body and an outlet positioned on a top face of the body.

9. The sensor assembly of claim 8, wherein a distance along a first direction between an outlet of the airflow generating component and the sensor mounted on the mounting portion is from 0.05 meter to 0.18 meter, and a distance along a second direction between the outlet of the airflow generating component and the sensor mounted on the mounting portion is from 0.05 meter to 0.25 meter.

10. The sensor assembly of claim 8, wherein the outlet of the air duct is smaller than the inlet of the air duct.

11. The sensor assembly of claim 8, wherein the mounting base has a temperature adjusting device configured for adjusting the temperature of an airflow passing through the air duct.

12. The sensor assembly of claim 8, wherein the mounting base comprises a fin, and the fin is positioned in front of the mounting portion, so as to guide an airflow towards the fin flowing on at least one side of the sensor mounted on the mounting portion.

13. The sensor assembly of claim 8, wherein the mounting base comprises an airflow generator, the airflow generator is configured for forming at least one airflow on a side of the sensor mounted on the mounting portion.

14. The sensor assembly of claim 13, wherein the airflow generator is positioned within the air duct and is configured for improving a flow speed of an airflow passing through the air duct.

15. A vehicle comprising the sensor assembly of claim 8, wherein the sensor assembly is mounted on the vehicle with the front face facing the same direction as the orientation of a head of the vehicle.

* * * * *